(12) United States Patent
Ito et al.

(10) Patent No.: US 11,752,986 B2
(45) Date of Patent: Sep. 12, 2023

(54) DRIVING ASSISTANCE DEVICE

(71) Applicant: TOYOTA JIDOSHA KABUSHIKI KAISHA, Toyota (JP)

(72) Inventors: Shogo Ito, Shizuoka (JP); Kohei Tochigi, Shizuoka (JP); Kumiko Kondo, Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 168 days.

(21) Appl. No.: 17/376,705

(22) Filed: Jul. 15, 2021

(65) Prior Publication Data
US 2022/0032883 A1 Feb. 3, 2022

(30) Foreign Application Priority Data
Aug. 3, 2020 (JP) ................................. 2020-131801

(51) Int. Cl.
*B60T 7/12* (2006.01)

(52) U.S. Cl.
CPC ............. *B60T 7/12* (2013.01); *B60T 2220/04* (2013.01)

(58) Field of Classification Search
CPC ...... B60T 7/12; B60T 2220/04; B60W 10/06; B60W 10/18; B60W 2540/10; B60W 2540/12; B60W 2554/802; B60W 2554/804
USPC .......................................................... 701/93
See application file for complete search history.

(56) References Cited

U.S. PATENT DOCUMENTS

| 11,420,622 | B2* | 8/2022 | Ikezawa .............. B60W 10/18 |
| 11,420,627 | B2* | 8/2022 | Otake ............ B60W 30/18009 |
| 2004/0030499 | A1* | 2/2004 | Knoop .................. B60W 10/18 340/436 |
| 2017/0174213 | A1* | 6/2017 | Nakagawa .............. B60T 7/042 |
| 2018/0173236 | A1* | 6/2018 | Yashiro ................ G05D 1/0214 |
| 2018/0215360 | A1* | 8/2018 | Nakagawa ............... B60T 7/18 |
| 2018/0370519 | A1* | 12/2018 | Yen ........................ B60W 50/04 |
| 2019/0155292 | A1* | 5/2019 | Gutmann .......... B60W 60/0013 |
| 2019/0220030 | A1* | 7/2019 | Ohmura ............ B60W 30/0953 |
| 2019/0232965 | A1* | 8/2019 | Watanabe ................ G01S 13/06 |
| 2019/0232970 | A1* | 8/2019 | Watanabe ........... B60W 30/143 |

(Continued)

FOREIGN PATENT DOCUMENTS

AU 2008264146 A1 * 7/2009
CA 2986160 A1 * 5/2019
(Continued)

*Primary Examiner* — Atul Trivedi
(74) *Attorney, Agent, or Firm* — Sughrue Mion, PLLC

(57) ABSTRACT

There is provided a driving assistance device that executes deceleration assistance of a host vehicle when a relative situation between a deceleration object in front of the host vehicle and the host vehicle satisfies a preset deceleration assistance precondition and a driver of the host vehicle does not operate an accelerator and a brake, the driving assistance device including a first deceleration assistance execution unit configured to execute a first deceleration assistance when the deceleration assistance precondition is satisfied in a state in which the driver of the host vehicle does not operate the accelerator and the brake, and a second deceleration assistance execution unit configured to execute a second deceleration assistance when the driver releases the accelerator or the brake in a state in which the deceleration assistance precondition is satisfied.

5 Claims, 4 Drawing Sheets

(56) References Cited

U.S. PATENT DOCUMENTS

| | | | |
|---|---|---|---|
| 2019/0278278 A1* | 9/2019 | Yasuda | B60W 10/06 |
| 2019/0291728 A1* | 9/2019 | Shalev-Shwartz | |
| | | | B60W 40/105 |
| 2020/0040984 A1* | 2/2020 | Chen | H04B 10/0775 |
| 2020/0108808 A1* | 4/2020 | Zhou | B60T 8/17 |
| 2022/0274591 A1* | 9/2022 | Ike | B60W 10/18 |
| 2022/0289190 A1* | 9/2022 | Inoue | B60W 30/143 |
| 2022/0297712 A1* | 9/2022 | Kajiwara | B60Q 1/343 |

FOREIGN PATENT DOCUMENTS

| | | | | |
|---|---|---|---|---|
| GB | 2526346 | A | * | 11/2015 |
| GB | 2526357 | A | * | 11/2015 |
| GB | 2537929 | A | * | 11/2016 |
| GB | 2546767 | A | * | 8/2017 |
| JP | 2013-218429 | A | | 10/2013 |
| JP | 2018-53981 | A | | 4/2018 |
| JP | 2018-58478 | A | | 4/2018 |

* cited by examiner

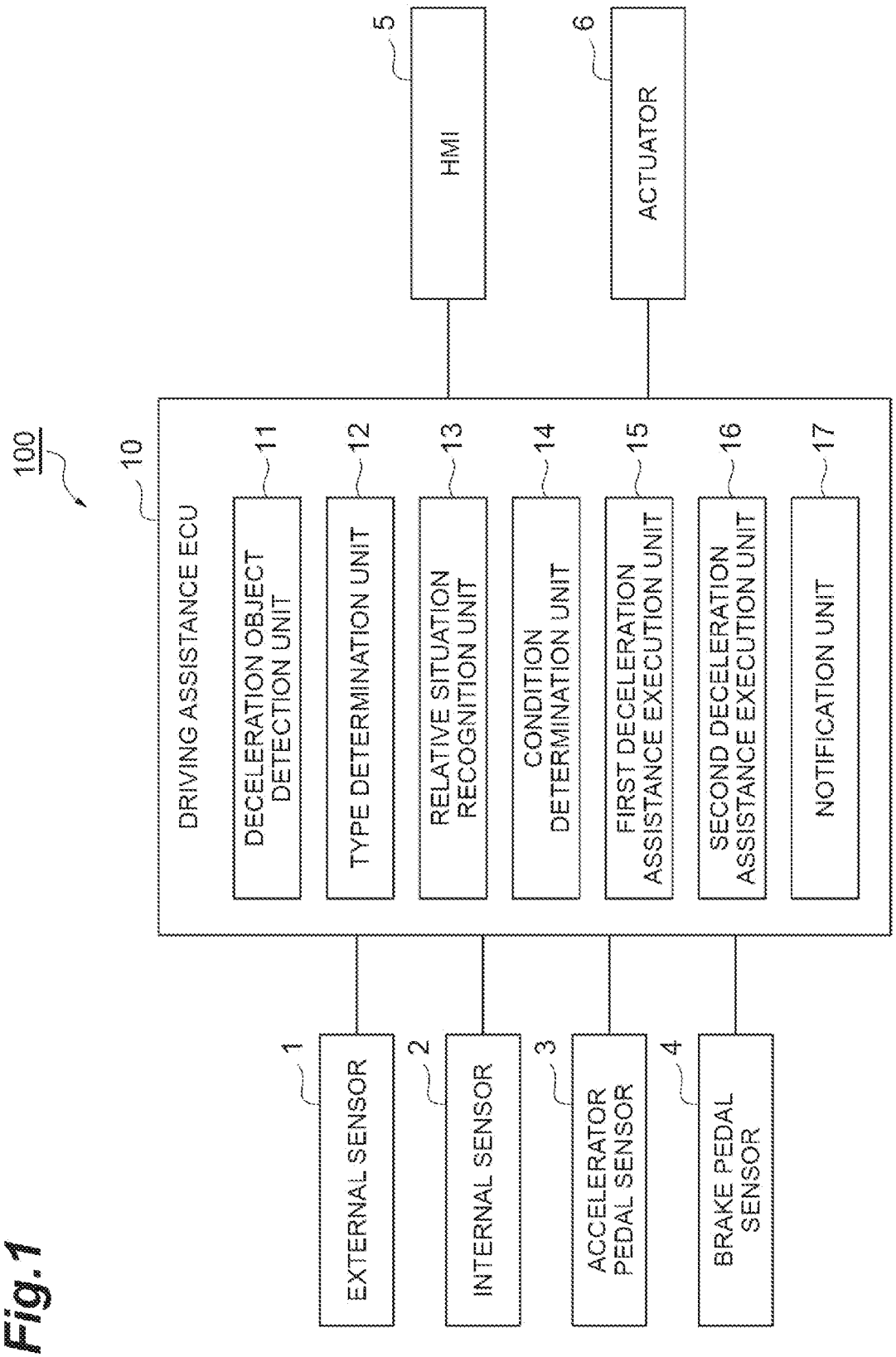

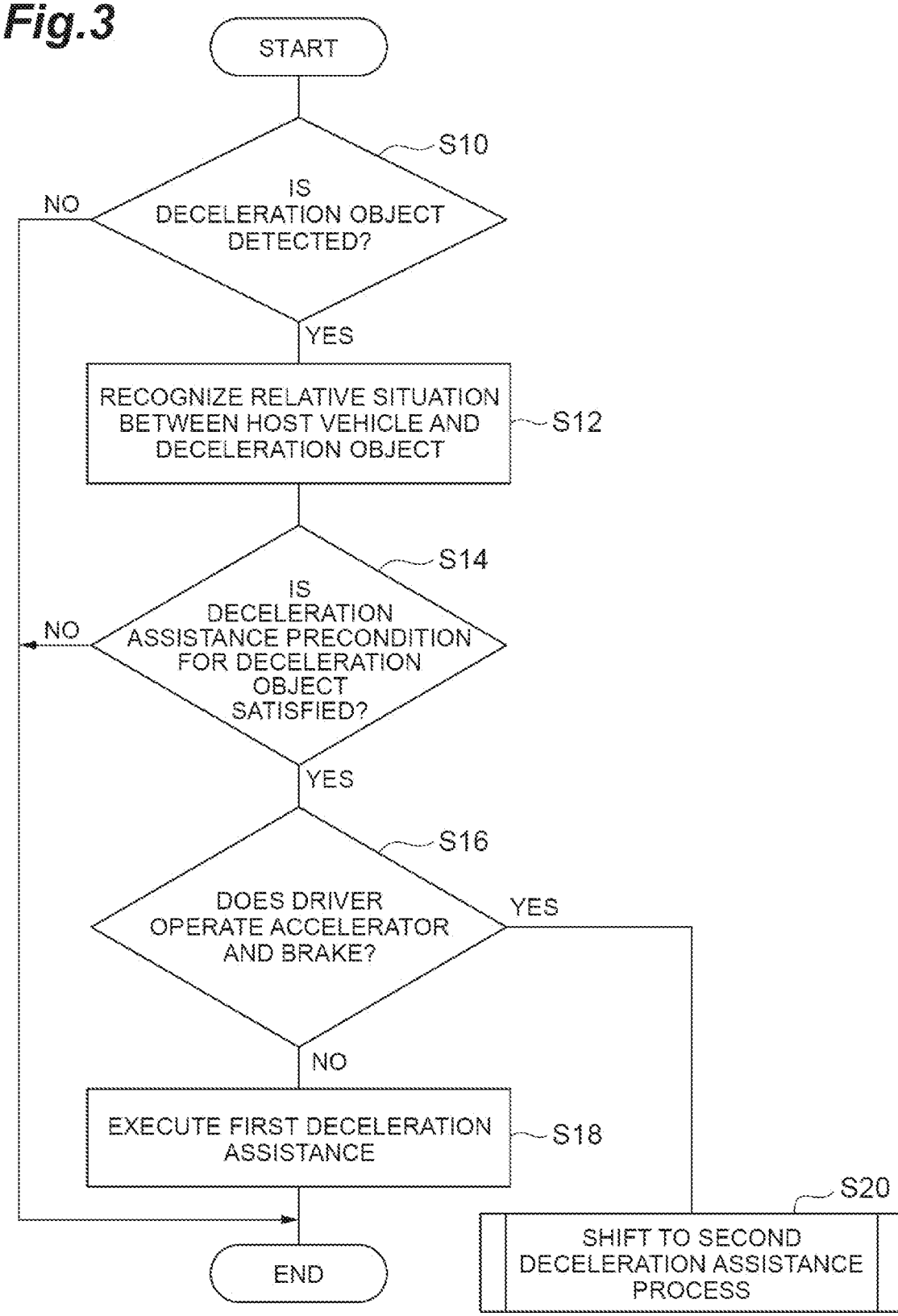

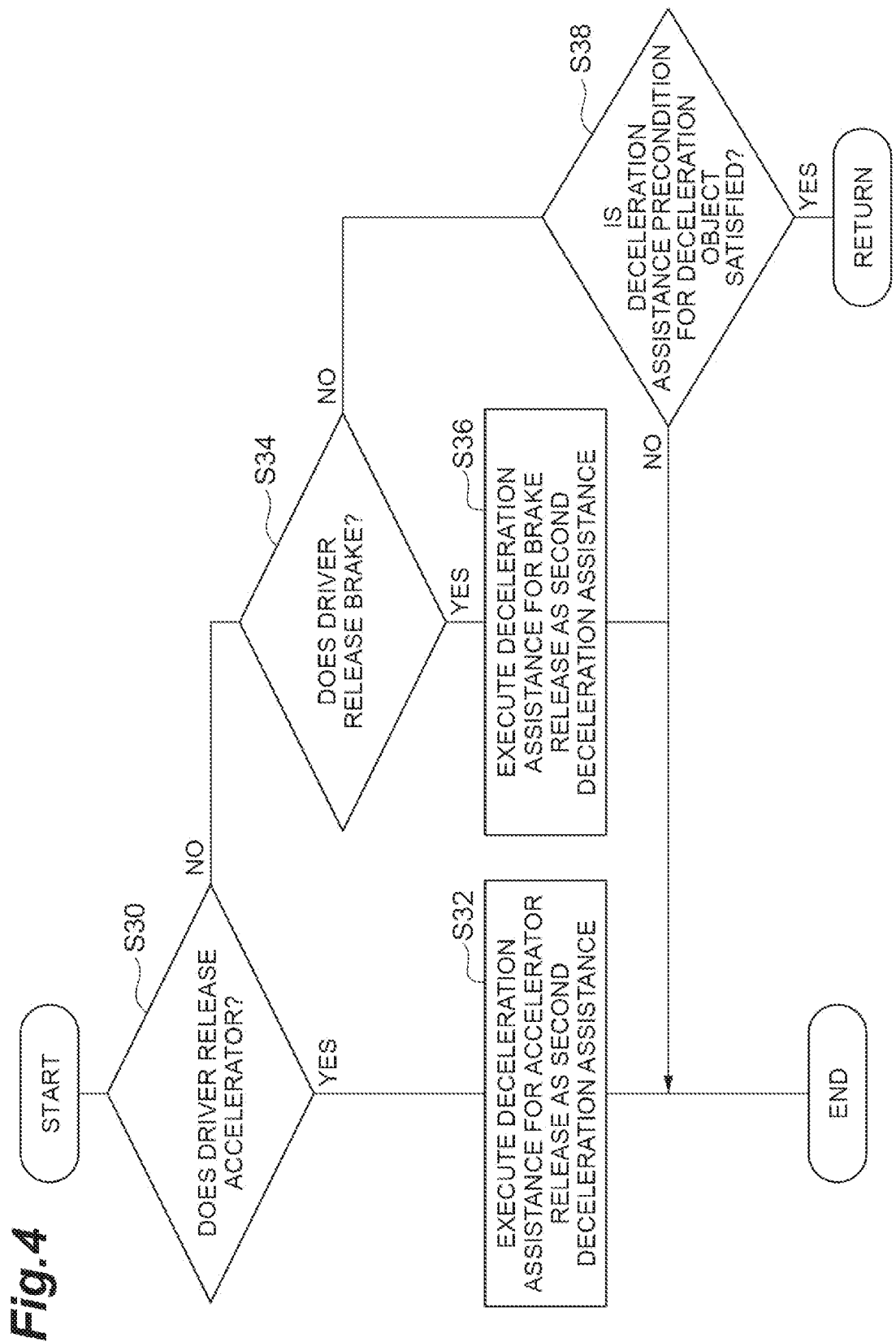

DRIVING ASSISTANCE DEVICE

TECHNICAL FIELD

The present disclosure relates to a driving assistance device.

CROSS-REFERENCE TO RELATED APPLICATION

This application claims the benefit of priority from Japanese Patent Application No. 2020-131801, filed Aug. 3, 2020, the entire contents of which are incorporated herein by reference.

BACKGROUND

In the related art, Japanese Unexamined Patent Publication No. 2013-218429 is known as a technical document relating to a driving assistance device. Japanese Unexamined Patent Publication No. 2013-218429 discloses a driving assistance device that starts deceleration assistance when a predetermined condition is satisfied by the distance from a vehicle to a deceleration object and a vehicle speed of the vehicle, and stops the deceleration assistance when the predetermined condition is not satisfied.

SUMMARY

In the above-mentioned driving assistance device in the related art, deceleration assistance is executed when the predetermined condition is satisfied by the distance from the vehicle to the deceleration object and the vehicle speed of the vehicle, but the driver's driving operation when the predetermined condition is satisfied cannot be taken into consideration. That is, the driver's perception of the vehicle situation is considered to differ depending on whether or not the driver performs the driving operation, even if the predetermined condition is satisfied, and thus, providing with the same deceleration assistance is likely to give the driver a sense of discomfort.

According to an aspect of the present disclosure, there is provided a driving assistance device that executes deceleration assistance of a host vehicle when a relative situation between a deceleration object in front of the host vehicle and the host vehicle satisfies a preset deceleration assistance precondition and a driver of the host vehicle does not operate an accelerator and a brake, the driving assistance device including a first deceleration assistance execution unit configured to execute a first deceleration assistance when the deceleration assistance precondition is satisfied in a state in which the driver of the host vehicle does not operate the accelerator and the brake, and a second deceleration assistance execution unit configured to execute a second deceleration assistance when the driver releases the accelerator or the brake in a state in which the deceleration assistance precondition is satisfied, in which the first deceleration assistance and the second deceleration assistance are different in at least one of a deceleration upper limit value, a deceleration jerk upper limit value, or a deceleration assistance start timing.

With the driving assistance device according to the aspect of the present disclosure, the first deceleration assistance, which is executed when the deceleration assistance precondition is satisfied in the state in which the driver of the host vehicle does not operate the accelerator and the brake, and the second deceleration assistance, which is executed when the driver releases the accelerator or the brake in the state in which the deceleration assistance precondition is satisfied, are different in at least one of the deceleration upper limit value, the deceleration jerk upper limit value, or the deceleration assistance start timing, and therefore it is possible to execute the deceleration assistance with a less sense of discomfort to the driver in response to the driver's accelerator release or brake release than the case where the same deceleration assistance is executed without considering the driving operation of the driver.

In the driving assistance device according to the aspect of the present disclosure, the second deceleration assistance execution unit may be configured to execute a deceleration assistance for accelerator release as the second deceleration assistance when the driver releases the accelerator in a state in which the deceleration assistance precondition is satisfied, and the deceleration assistance for accelerator release may be a deceleration assistance that has at least one of the deceleration upper limit value greater than the first deceleration assistance, the deceleration jerk upper limit value greater than the first deceleration assistance, or the deceleration assistance start timing later than the first deceleration assistance.

Alternatively, in the driving assistance device according to the aspect of the present disclosure, the second deceleration assistance execution unit may be configured to execute a deceleration assistance for brake release as the second deceleration assistance when the driver releases the brake in a state in which the deceleration assistance precondition is satisfied, and the deceleration assistance for brake release may be a deceleration assistance that has at least one of the deceleration upper limit value smaller than the first deceleration assistance, the deceleration jerk upper limit value smaller than the first deceleration assistance, or the deceleration assistance start timing later than the first deceleration assistance.

Alternatively, in the driving assistance device according to the aspect of the present disclosure, the second deceleration assistance execution unit may be configured to execute a deceleration assistance for accelerator release as the second deceleration assistance when the driver releases the accelerator in a state in which the deceleration assistance precondition is satisfied, and execute a deceleration assistance for brake release as the second deceleration assistance when the driver releases the brake in a state in which the deceleration assistance precondition is satisfied, and the deceleration assistance for accelerator release may be a deceleration assistance that has at least one of the deceleration upper limit value greater than the deceleration assistance for brake release, the deceleration jerk upper limit value greater than the deceleration assistance for brake release, or the deceleration assistance start timing earlier than the deceleration assistance for brake release.

According to the aspect of the present disclosure, it is possible to execute deceleration assistance with less sense of discomfort to the driver.

BRIEF DESCRIPTION OF THE DRAWINGS

FIG. 1 is a block diagram illustrating a driving assistance device according to an embodiment.

FIG. 3 is a flowchart showing an example of a first deceleration assistance determination process.

FIG. 4 is a flowchart showing an example of a second deceleration assistance determination process.

DETAILED DESCRIPTION

Figure 2A:
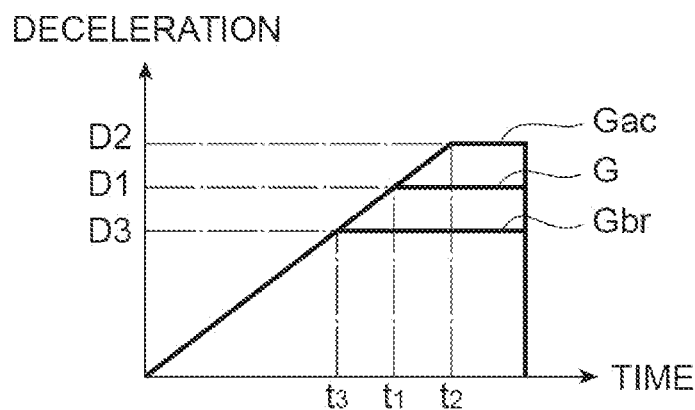
FIG. 2A is a graph showing an example of a deceleration upper limit value of each deceleration assistance.

Hereinafter, embodiments of the present disclosure will be described with reference to the drawings.

A driving assistance device 100 according to the present embodiment illustrated in FIG. 1 is a device that is mounted on a vehicle (host vehicle) such as a passenger car and assists the driver in driving the host vehicle. When a deceleration object such as a preceding vehicle or a traffic signal in front of the host vehicle is detected, the driving assistance device 100 executes deceleration assistance on the host vehicle under predetermined conditions. The deceleration object is an object for deceleration assistance. The deceleration object includes a preceding vehicle, a traffic signal, and a temporary stop line. The deceleration object may include pedestrians, bicycles, or the like in addition to the preceding vehicle, and includes curves, pedestrian crossings, falling objects, construction installations, structures, or the like in addition to the traffic signal and the temporary stop line.

The deceleration assistance is a driving assistance for decelerating the host vehicle to a preset target vehicle speed. The target vehicle speed is not particularly limited, and may be 0 km/h or 10 km/h. The target vehicle speed may be determined depending on the type of deceleration object. When the deceleration object is a traffic signal, the target vehicle speed for deceleration assistance may be changed depending on the lighting state of the traffic signal (lighting state of a green light, a yellow light, a red light, and the like). The target vehicle speed is not limited to the speed of the host vehicle when the deceleration object is a moving object such as a preceding vehicle. The target vehicle speed may be the relative speed between the host vehicle and the deceleration object may be used.

Configuration of Driving Assistance Device

The configuration of the driving assistance device 100 according to an embodiment will be described with reference to the drawings. As illustrated in FIG. 1, the driving assistance device 100 includes a driving assistance electronic control unit (ECU) 10 that collectively manages devices. The driving assistance ECU 10 is an electronic control unit having a central processing unit (CPU), a read only memory (ROM), a random access memory (RAM), and the like. In the driving assistance ECU 10, for example, various functions are implemented by loading a program stored in the ROM into the RAM and executing the program loaded in the RAM in the CPU. The driving assistance ECU 10 may be constituted by a plurality of electronic units.

The driving assistance ECU 10 is connected to an external sensor 1, an internal sensor 2, an accelerator pedal sensor 3, a brake pedal sensor 4, a human machine interface (HMI) 5, and an actuator 6.

The external sensor 1 is a detection device that detects the situation around the host vehicle. The external sensor 1 includes at least one of a camera and a radar sensor. The camera is an imaging device that captures images of the external situation of the host vehicle. The camera is provided on the back side of the windshield of the host vehicle, for example, and captures images of the situation in front of the host vehicle. The camera transmits the imaging information regarding the external situation of the host vehicle to the driving assistance ECU 10. The camera may be a monocular camera or a stereo camera.

The radar sensor is a detection device that detects objects around the host vehicle by using radio waves (for example, millimeter waves) or light. The radar sensor includes, for example, a millimeter-wave radar or a LIDAR (light detection and ranging). The radar sensor transmits radio waves or light to the surroundings of the host vehicle, and detects objects by receiving the radio waves or light reflected from the objects. The radar sensor transmits the information regarding the detected objects to the driving assistance ECU 10. The objects include fixed obstacles such as guardrails and buildings, as well as moving obstacles such as pedestrians, bicycles, and other vehicles.

The internal sensor 2 is a detection device that detects a travelling state of the host vehicle. The internal sensor 2 includes a vehicle speed sensor, an acceleration sensor, and a yaw rate sensor. The vehicle speed sensor is a detector that detects the speed of the host vehicle. As the vehicle speed sensor, for example, a wheel speed sensor is used that is provided on a wheel of the host vehicle, a drive shaft rotating integrally with the wheel, or the like, and detects the rotation speed of the wheel. The vehicle speed sensor transmits the detected vehicle speed information (wheel speed information) to the driving assistance ECU 10.

The acceleration sensor is a detector that detects the acceleration of the host vehicle. The acceleration sensor includes, for example, a front-rear acceleration sensor that detects the acceleration in the front-rear direction of the host vehicle and a lateral acceleration sensor that detects the lateral acceleration of the host vehicle. The acceleration sensor transmits, for example, the acceleration information regarding the host vehicle to the driving assistance ECU 10. The yaw rate sensor is a detector that detects the yaw rate (rotation angular velocity) around the vertical axis of the center of gravity of the host vehicle. As the yaw rate sensor, for example, a gyro sensor can be used. The yaw rate sensor transmits the detected yaw rate information regarding the host vehicle to the driving assistance ECU 10.

The accelerator pedal sensor 3 is provided, for example, on a shaft portion of the accelerator pedal of the host vehicle to detect the amount of depression of the accelerator pedal. The accelerator pedal sensor 3 transmits an accelerator operation signal corresponding to the detected amount of depression of the accelerator pedal to the driving assistance ECU 10.

The brake pedal sensor 4 is provided, for example, on a shaft portion of the brake pedal of the host vehicle to detect the amount of depression of the brake pedal. The brake pedal sensor 4 transmits a brake operation signal corresponding to the detected amount of depression of the brake pedal to the driving assistance ECU 10.

The HMI 5 is an interface for inputting and outputting information between the driving assistance device 100 and the driver. The HMI 5 includes, for example, a display and a speaker. The HMI 5 performs an image output of the display and a sound output of the speaker, in response to a control signal from the driving assistance ECU 10. The display may be a head up display (HUD).

The actuator 6 is a device used for controlling the host vehicle. The actuator 6 includes at least a drive actuator and a brake actuator. The actuator 6 may include a steering actuator. The drive actuator controls the amount of air supplied to the engine (throttle opening degree) in response to the control signal from the driving assistance ECU 10 to control the driving force of the host vehicle. When the host vehicle is a hybrid vehicle, the control signal from the driving assistance ECU 10 is input to a motor as a power source, in addition to the amount of air supplied to the engine, to control the driving force. When the host vehicle is an electric vehicle, the control signal from the driving assistance ECU 10 is input to the motor as the power source to control the driving force. In the above cases, the motor as the power source constitutes the actuator 6.

The brake actuator controls a brake system in response to the control signal from the driving assistance ECU 10 to control the braking force applied to the wheels of the host vehicle. As the brake system, for example, a hydraulic brake system can be used. The steering actuator controls the drive of an assist motor for controlling the steering torque in an electric power steering system in response to the control signal from the driving assistance ECU 10. Therefore, the steering actuator controls the steering torque of the host vehicle.

Next, a functional configuration of the driving assistance ECU 10 will be described. As illustrated in FIG. 1, the driving assistance ECU 10 includes a deceleration object detection unit 11, a type determination unit 12, a relative situation recognition unit 13, a condition determination unit 14, a first deceleration assistance execution unit 15, a second deceleration assistance execution unit 16, and a notification unit 17. A part of functions of the driving assistance ECU 10 to be described below may be executed by a server capable of communicating with the host vehicle.

The deceleration object detection unit 11 detects a deceleration object, such as a preceding vehicle in front of the host vehicle, based on the detection result of the external sensor 1. The deceleration object detection unit 11 detects a deceleration object based on an image captured by the camera or object information of the radar sensor.

The type determination unit 12 determines the type of deceleration object based on the detection result of the external sensor 1. The type determination unit 12 determines whether the type of deceleration object is included in a position-fixed object or a moving object. A position-fixed object means an object of which the position is fixed with respect to the road. Specifically, the position-fixed object includes a traffic signal and a temporary stop line. The position-fixed object may include a part of the road or a curve. The position-fixed object may include a structure such as a pedestrian crossing, a construction installation object, a falling object, and a guardrail. The moving object means an object that can move with respect to a road. The moving object includes a preceding vehicle that is traveling or stopped. Bicycles and pedestrians may be included as the moving object.

The type determination unit 12 recognizes the types of traffic signals, temporary stop lines, preceding vehicles, or the like, by performing pattern matching using a pre-stored image pattern for each type, based on, for example, an image in front of the host vehicle captured by a camera, thereby determining whether the type of the deceleration object is included in the position-fixed object or the moving object. Further, when the deceleration object is a traffic signal, the type determination unit 12 determines the lighting state of the traffic signal by using a well-known image processing technique.

The type determination unit 12 may determine the type of deceleration object based on the object information of the radar sensor. Further, the type determination unit 12 may be a part of the deceleration object detection unit 11. In this case, the deceleration object detection unit 11 performs both detection of the deceleration object and determination of the type of deceleration object.

The relative situation recognition unit 13 recognizes the relative situation between the host vehicle and the deceleration object. The relative situation includes at least the distance between the host vehicle and the deceleration object (distance in the front-rear direction or the traveling direction of the host vehicle). The relative situation may include the relative speed between the host vehicle and the deceleration object.

The relative situation recognition unit 13 recognizes the relative situation between the host vehicle and the deceleration object based on, for example, the detection result of the external sensor 1. When the deceleration object is a vehicle capable of inter-vehicle communication with the host vehicle, the relative situation recognition unit 13 may recognize the relative situation between the host vehicle and the deceleration object by using the information acquired by inter-vehicle communication. The relative situation recognition unit 13 may recognize the relative speed between the host vehicle and the deceleration object based on, for example, the speed of the deceleration object acquired by inter-vehicle communication and the speed of the host vehicle. The relative situation recognition unit 13 may use the detection result of the internal sensor 2 (detection result of the vehicle speed sensor) to recognize the relative speed between the host vehicle and the deceleration object.

The condition determination unit 14 determines whether or not the deceleration assistance precondition for the deceleration object is satisfied. The deceleration assistance precondition is a preset precondition to be used for determining the start of deceleration assistance. The condition determination unit 14 determines whether or not the deceleration assistance precondition is satisfied based on at least the distance between the host vehicle and the deceleration object.

The deceleration assistance preconditions may be changed depending on the type of deceleration object. For example, when the type of deceleration object is a preceding vehicle, the condition determination unit 14 determines whether or not the deceleration assistance precondition for the preceding vehicle is satisfied based on the relative situation between the host vehicle and the deceleration object.

Specifically, the condition determination unit 14 determines that the deceleration assistance precondition for the preceding vehicle is satisfied when the speed of the host vehicle is higher than the speed of the preceding vehicle (the relative speed is a positive value in an approach direction) and time to collusion (TTC) between the host vehicle and the preceding vehicle is less than a TTC threshold value. The TTC is obtained by dividing the distance between the host vehicle and the deceleration object (preceding vehicle) by the relative speed (approach speed) between the host vehicle and the deceleration object. The TTC threshold value is a preset value threshold. Hereinafter, the threshold value used in the description means a threshold value of a preset value.

Instead of the TTC, the condition determination unit 14 may determine that the deceleration assistance precondition for the preceding vehicle is satisfied when a time headway (THW), which is obtained by dividing the distance between the host vehicle and the preceding vehicle by the speed of the host vehicle is less than a THW threshold value. Instead of the TTC, the condition determination unit 14 may determine that the deceleration assistance precondition for the preceding vehicle is satisfied when the distance between the host vehicle and the preceding vehicle is less than a distance threshold value.

The condition determination unit 14 may determine that the deceleration assistance precondition for the preceding vehicle is satisfied when the speed of the host vehicle is higher than the speed of the preceding vehicle and the required deceleration of the host vehicle is equal to or greater than a deceleration threshold value. The required deceleration can be, for example, the deceleration required to prevent the distance between the host vehicle and the preceding vehicle from being less than a predetermined threshold value for each speed. The required deceleration may be the deceleration required to prevent the distance between the host vehicle and the preceding vehicle from being less than a certain value.

When the type of deceleration object is a temporary stop line, the condition determination unit 14 determines whether or not the deceleration assistance precondition for the temporary stop line is satisfied, based on the speed of the host vehicle detected by the internal sensor 2 (vehicle speed sensor) and the relative situation of the host vehicle and the temporary stop line.

Specifically, when the speed of the host vehicle is equal to or higher than an assistance start speed threshold value and the TTC between the host vehicle and the temporary stop line is less than the TTC threshold value, the condition determination unit 14 may determine that the deceleration assistance precondition for the temporary stop line is satisfied. In this case, the TTC corresponds to the arrival time to the temporary stop line by the host vehicle. Instead of the TTC, the condition determination unit 14 may determine that the deceleration assistance precondition for the preceding vehicle is satisfied when the distance between the host vehicle and the temporary stop line is less than a distance threshold value.

Further, when the speed of the host vehicle is equal to or higher than an assistance start speed threshold value and the required deceleration of the host vehicle is equal to or greater than the deceleration threshold value, the condition determination unit 14 may determine that the deceleration assistance precondition for the temporary stop line is satisfied. In this case, the required deceleration is, for example, the deceleration required for the host vehicle to stop at the position of the temporary stop line. The TTC threshold value, the distance threshold value, and the deceleration threshold value may be different depending on the type of deceleration object.

When the type of deceleration object is a traffic signal, the condition determination unit 14 determines the deceleration assistance precondition for the temporary stop line in front of the traffic signal. Here, as the type of deceleration object is described as the traffic signal, when the temporary stop line in front of the traffic signal cannot be detected by the external sensor 1 due to the rubbing of a white line of the temporary stop line or the like, the condition determination unit 14 determines the deceleration assistance precondition on the assumption that the temporary stop line exists at a position a certain distance before the traffic signal. The determination of the deceleration assistance precondition for the temporary stop line can be applied when the type of deceleration object is included in the position-fixed object.

When the type of deceleration object is the traffic signal, the condition determination unit 14 may determine the deceleration assistance precondition based on the lighting state of the traffic signal when the host vehicle approaches the traffic signal. When the host vehicle approaches the traffic signal means, for example, when the TTC of the host vehicle with respect to the position of the temporary stop line in front of the traffic signal or the position a certain distance before the traffic signal becomes less than the TTC threshold value. Instead of the TTC, THW may be used, or the distance between the host vehicle and the position of the temporary stop line (or a position a certain distance before the traffic signal) may be used.

When the host vehicle approaches the traffic signal, the condition determination unit 14 determines whether or not the traffic signal is in a passage permitted state based on the detection result of the external sensor 1 (for example, the image captured by the camera). Here, the passage permitted state means a state in which passage is permitted in the traveling direction of the traveling lane of the host vehicle. The traveling direction of the traveling lane of the host vehicle can be recognized from image recognition of an arrow (arrow of road surface paint) shown on the road surface of the traveling lane or image recognition of a sign indicating the traveling direction of the traveling lane. The traveling direction of the traveling lane of the host vehicle may be recognized from the position of the host vehicle and map information (map information containing the traveling direction information for each lane).

For example, when the traffic signal is a traffic signal with a left turn arrow and the traveling lane of the host vehicle is a left turn lane, the condition determination unit 14 determines that the passage is permitted when the left turn arrow is lit. When the traveling lane of the host vehicle is a straight-ahead lane, the condition determination unit 14 does not determine that the passage is permitted even if the left turn arrow is lit. When the traveling lane of the host vehicle is a straight-ahead lane, the condition determination unit 14 determines that the passage is permitted when the traffic signal is a green light or when a straight-ahead arrow of the traffic signal is lit.

When the traveling direction of the traveling lane of the host vehicle cannot be recognized, the condition determination unit 14 determines whether or not the traffic signal is in the passage permitted state based on the lighting state of the traffic signal. In this case, the condition determination unit 14 may determine that the passage is permitted when the lighting state of the traffic signal is the green light. Hereinafter, a state in which the traffic signal prohibits passage in the traveling lane of the host vehicle is referred to as a passage prohibited state, and a state in the middle of transition from the passage permitted state to the passage prohibited state is referred to as a transition state. The passage prohibited state is, for example, in a red light state. The transition state is, for example, in a yellow light state.

When it is determined that the traffic signal is not in the passage permitted state (when the traffic signal is in the passage prohibited state or the transition state), the condition determination unit 14 determines that the deceleration assistance precondition is satisfied.

When it is determined that the traffic signal is in the passage permitted state, the condition determination unit 14 determines whether the host vehicle turns right or left. The condition determination unit 14 determines whether the host vehicle turns right or left based on, for example, the traveling direction of the traveling lane of the host vehicle. When the traveling lane is a right turn lane or a left turn lane, the condition determination unit 14 determines that the host vehicle turns right or left. The condition determination unit 14 may determine whether the host vehicle turns right or left based on the lighting state of a direction indicator of the host vehicle.

When it is determined that the traffic signal is in the passage permitted state and the host vehicle turns right or left, the condition determination unit 14 determines that the deceleration assistance precondition is satisfied. When it is not determined that the traffic signal is in the passage permitted state and the host vehicle turns right or left (when the host vehicle travels straight ahead), the condition determination unit 14 determines that the deceleration assistance precondition is not satisfied.

The first deceleration assistance execution unit 15 executes a first deceleration assistance when the condition determination unit 14 determines that the deceleration assistance precondition is satisfied in the state where the driver of the host vehicle does not operate the accelerator and the brake.

The first deceleration assistance is a deceleration assistance based on a preset standard deceleration pattern G (hereinafter, referred to as a standard deceleration pattern G). The deceleration pattern is a change in deceleration (target deceleration) set in advance with respect to the relative situation between the host vehicle and the deceleration object. A plurality of deceleration patterns are stored in, for example, a database, and may be selected (set) depending on the relative situation between the host vehicle and the deceleration object. The deceleration pattern may be calculated from the relative situation between the host vehicle and the deceleration object by using a predetermined calculation formula. The deceleration pattern is preset before the start of deceleration assistance. The same is true for any of deceleration patterns to be described later.

In the first deceleration assistance, the deceleration upper limit value in the standard deceleration pattern G is referred to as a standard deceleration upper limit value D1. Further, the deceleration jerk upper limit value in the standard deceleration pattern G is referred to as a standard jerk upper limit value. The start timing of deceleration assistance in the standard deceleration pattern G is referred to as a standard deceleration assistance start timing Ts1.

The first deceleration assistance execution unit 15 determines that the driver does not operate the accelerator and the brake based on the accelerator operation signal of the accelerator pedal sensor 3 and the brake operation signal of the brake pedal sensor 4. The first deceleration assistance execution unit 15 recognizes that the driver does not operate the accelerator when the amount of depression of the accelerator pedal of the driver is less than a first accelerator operation determination threshold value, based on, for example, the accelerator operation signal of the accelerator pedal sensor 3. Similarly, the first deceleration assistance execution unit 15 recognizes that the driver does not operate the brake when the amount of depression of the brake pedal of the driver is less than a first brake operation determination threshold value, based on, for example, the brake operation signal of the brake pedal sensor 4.

The first deceleration assistance execution unit 15 executes the first deceleration assistance by transmitting the control signal to the actuator 6, when it is determined that the driver of the host vehicle does not operate the accelerator and the brake and it is determined by the condition determination unit 14 that the deceleration assistance precondition is satisfied. The first deceleration assistance execution unit 15 executes the first deceleration assistance by, for example, control of the engine brake by the drive actuator and/or braking force control by the brake actuator.

The second deceleration assistance execution unit 16 executes the second deceleration assistance, when the driver releases the accelerator or the brake performed in the state where the condition determination unit 14 determines that the deceleration assistance precondition is satisfied.

The second deceleration assistance includes deceleration assistance for accelerator release and deceleration assistance for brake release. The deceleration assistance for accelerator release is a deceleration assistance executed when the driver releases the accelerator.

In the deceleration assistance for accelerator release, the deceleration assistance is executed by a preset deceleration pattern Gac for accelerator release. The deceleration pattern Gac for accelerator release is a deceleration assistance having the deceleration upper limit value or the deceleration jerk upper limit value greater than the standard deceleration pattern G in the first deceleration assistance, or having the deceleration assistance start timing earlier than the standard deceleration pattern G.

In the deceleration pattern Gac for accelerator release, the deceleration upper limit value is referred to as a deceleration upper limit value D2 for accelerator release. Further, the deceleration jerk upper limit value in the deceleration pattern Gac for accelerator release is referred to as a jerk upper limit value for accelerator release. The start timing of deceleration assistance in the deceleration pattern Gac for accelerator release is referred to as a deceleration assistance start timing Ts2 for accelerator release.

The deceleration assistance for brake release is a deceleration assistance executed when the driver releases the brake. In the deceleration assistance for brake release, deceleration assistance is executed by a preset deceleration pattern Gbr for brake release. The deceleration pattern Gbr for brake release is a deceleration assistance having the deceleration upper limit value or the deceleration jerk upper limit value smaller than the standard deceleration pattern G in the first deceleration assistance, or having the deceleration assistance start timing later than the standard deceleration pattern G.

In the deceleration pattern Gbr for brake release, the deceleration upper limit value is referred to as a deceleration upper limit value D3 for brake release. Further, the deceleration jerk upper limit value in the deceleration pattern Gbr for brake release is referred to as a jerk upper limit value for brake release. The start timing of deceleration assistance in the deceleration pattern Gbr for brake release is referred to as a deceleration assistance start timing Ts3 for brake release.

The second deceleration assistance execution unit 16 determines that the driver releases the accelerator or the brake based on the accelerator operation signal of the accelerator pedal sensor 3 and the brake operation signal of the brake pedal sensor 4.

The second deceleration assistance execution unit 16 determines that the driver releases the accelerator when it is determined that the amount of depression of the accelerator pedal of the driver has changed from a second accelerator operation determination threshold value or higher to less than the second accelerator operation determination threshold value, based on, for example, the accelerator operation signal of the accelerator pedal sensor 3. The second accelerator operation determination threshold value may be the same value as the first accelerator operation determination threshold value, or may be a value greater than the first accelerator operation determination threshold value.

Alternatively, the second deceleration assistance execution unit 16 may determine that the driver releases the accelerator when it is determined that the amount of depression of the accelerator pedal of the driver has changed from the second accelerator operation determination threshold value or higher to less than a third accelerator operation determination threshold value, based on the accelerator operation signal of the accelerator pedal sensor 3. The third accelerator operation determination threshold value is smaller than the second accelerator operation determination threshold value.

Similarly, the second deceleration assistance execution unit 16 determines that the driver releases the brake when it is determined that the amount of depression of the brake pedal of the driver has changed from a second brake operation determination threshold value or higher to less than the second brake operation determination threshold value, based on, for example, the brake operation signal of the brake pedal sensor 4. The second brake operation determination threshold value may be the same value as the first brake operation determination threshold value, or may be a value greater than the first brake operation determination threshold value.

Alternatively, the second deceleration assistance execution unit 16 may determine that the driver releases the brake when it is determined that the amount of depression of the brake pedal of the driver has changed from the second brake operation determination threshold value or higher to less than a third brake operation determination threshold value, based on the brake operation signal of the brake pedal sensor 4. The third brake operation determination threshold value is smaller than the second brake operation determination threshold value. The second deceleration assistance execution unit 16 may determine that the driver releases the accelerator release or the brake by using another method.

Hereinafter, with reference to FIGS. 2A to 2C, a relationship between the standard deceleration pattern G in the first deceleration assistance, and the deceleration pattern Gac for accelerator release and the deceleration pattern Gbr for brake release in the second deceleration assistance will be described.

FIG. 2A is a graph showing an example of the deceleration upper limit value of each deceleration assistance. The vertical axis represents deceleration, and the horizontal axis represents time. In FIG. 2A, an example in which merely the deceleration upper limit value is different is illustrated. A time point at which the standard deceleration pattern G reaches the standard deceleration upper limit value D1 is shown as t1, a time point at which the deceleration pattern Gac for accelerator release reaches the deceleration upper limit value D2 for accelerator release is shown as t2, and a time point at which the deceleration pattern Gbr for brake release reaches the deceleration upper limit value D3 for brake release is shown as t3. In FIG. 2A, the deceleration jerk and the deceleration assistance start timing are the same, and thus the time point t3, the time point t1, and the time point t2 are shown in this order.

As illustrated in FIG. 2A, the deceleration upper limit value D2 for accelerator release of the deceleration pattern Gac for accelerator release can be set to a greater value than the standard deceleration upper limit value D1 of the standard deceleration pattern G. The deceleration upper limit value D3 for brake release of the deceleration pattern Gbr for brake release can be set to a smaller value than the standard deceleration upper limit value D1 of the standard deceleration pattern G. That is, in the deceleration pattern Gac for accelerator release, the amount of assistance is greater than in the deceleration pattern Gbr for brake release.

Figure 2B:
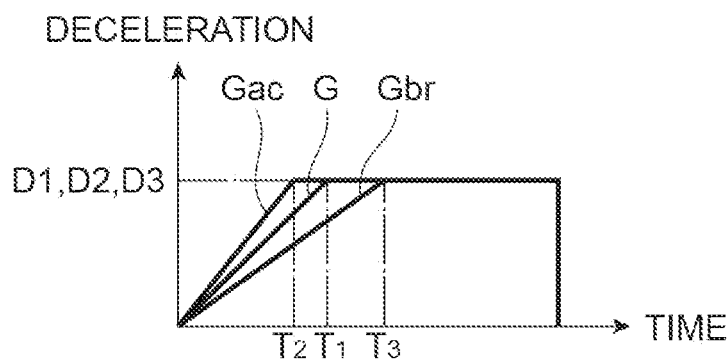
FIG. 2B is a graph showing an example of a deceleration jerk upper limit value of each deceleration assistance.

FIG. 2B is a graph showing an example of the deceleration jerk upper limit value of each deceleration assistance. In FIG. 2B, an example in which merely the deceleration jerk upper limit value is different is illustrated. Here, the standard deceleration upper limit value D1, the deceleration upper limit value D2 for accelerator release, and the deceleration upper limit value D3 for brake release are the same values. A time point at which the standard deceleration pattern G reaches the standard deceleration upper limit value D1 is shown as T1, a time point at which the deceleration pattern Gac for accelerator release reaches the deceleration upper limit value D2 for accelerator release is shown as T2, and a time point at which the deceleration pattern Gbr for brake release reaches the deceleration upper limit value D3 for brake release is shown as T3. In FIG. 2B, the time point T2, the time point T1, and the time point T3 are shown in this order.

As illustrated in FIG. 2B, the jerk upper limit value for accelerator release of the deceleration pattern Gac for accelerator release can be set to a greater value than the standard jerk upper limit value of the standard deceleration pattern G. The jerk upper limit value for brake release of the deceleration pattern Gbr for brake release can be set to a smaller value than the standard jerk upper limit value of the standard deceleration pattern G. In the deceleration pattern Gac for accelerator release, the amount of assistance is greater than in the deceleration pattern Gbr for brake release.

Figure 2C:
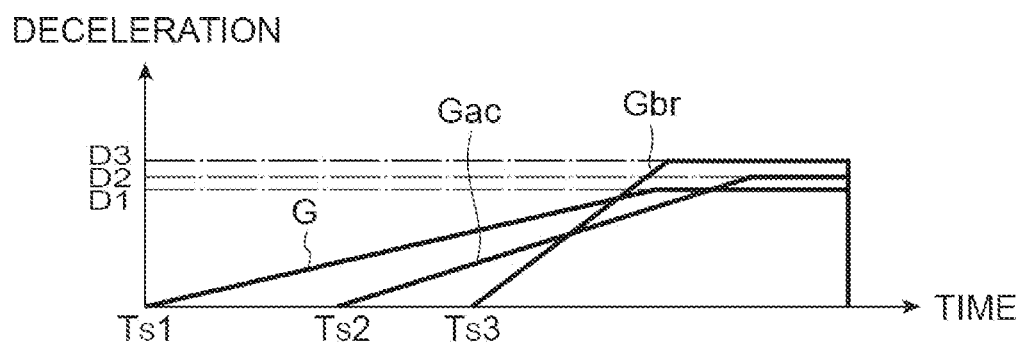
FIG. 2C is a graph showing an example of a start timing of each deceleration assistance.

FIG. 2C is a graph showing an example of the start timing of each deceleration assistance. In FIG. 2C, an example in which the deceleration start timing is mainly different is illustrated. As illustrated in FIG. 2C, the deceleration assistance start timing Ts2 for accelerator release of the deceleration pattern Gac for accelerator release and the deceleration assistance start timing Ts3 for brake release of the deceleration pattern Gbr for brake release can be set later than the standard deceleration assistance start timing Ts1 in the standard deceleration pattern G. This is because it is considered that the driver releases the accelerator or the brake after recognizing the situation of the vehicle.

Further, the deceleration assistance start timing Ts3 for brake release can be set earlier than the deceleration assistance start timing Ts2 for accelerator release. This is because it is considered that the driver releases the brake by determining that the need for deceleration is reduced.

In FIG. 2C, the standard deceleration upper limit value D1, the deceleration upper limit value D2 for accelerator release, and the deceleration upper limit value D3 for brake release are different values, but they may be the same values. Similarly, the deceleration jerk upper limit value may be the same value.

The notification unit 17 notifies the driver of the host vehicle regarding driving assistance. The notification unit 17 transmits a control signal to the HMIS to perform a notification including at least one of the image output of the display and the sound output of the speaker. The notification unit 17 may issue a deceleration assistance start notification before the execution of the first deceleration assistance and/or before the execution of the second deceleration assistance. The deceleration assistance start notification is a notification for notifying the driver of the start of deceleration assistance. The content of the deceleration assistance start notification is not particularly limited.

Process of Driving Assistance Device

Next, a process of the driving assistance device 100 according to the present embodiment will be described with reference to the drawings. FIG. 3 is a flowchart showing an example of a deceleration assistance start process. This deceleration start process is performed when the driving assistance function is being executed.

As illustrated in FIG. 3, the driving assistance ECU 10 of the driving assistance device 100 determines whether or not the deceleration object has been detected through the deceleration object detection unit 11 in S10. The deceleration object detection unit 11 detects a deceleration object in front of the host vehicle, based on the detection result of the external sensor 1. When it is determined that the deceleration object is detected (YES in S10), the driving assistance ECU 10 shifts the process to S12. When it is not determined that the deceleration object is detected (NO in S10), the driving assistance ECU 10 ends the current process. Then, the driving assistance ECU 10 repeats the process from S10 again after a certain period of time has elapsed.

In S12, the driving assistance ECU 10 recognizes the relative situation between the host vehicle and the deceleration object through the relative situation recognition unit 13. The relative situation recognition unit 13 recognizes the relative situation between the host vehicle and the deceleration object based on, for example, the detection result of the external sensor 1. At this time, the type determination unit 12 may determine the type of deceleration object.

In S14, the driving assistance ECU 10 determines whether or not the deceleration assistance precondition for the deceleration object is satisfied through the condition determination unit 14. For example, when the type of deceleration object is a preceding vehicle, the condition determination unit 14 determines whether or not the deceleration assistance precondition for the preceding vehicle is satisfied based on the relative situation between the host vehicle and the deceleration object. When it is determined that the deceleration assistance precondition is satisfied (YES in S14), the driving assistance ECU 10 shifts the process to S16. When it is not determined that the deceleration assistance precondition is satisfied (No in S14), the driving assistance ECU 10 ends the current process. Then, the driving assistance ECU 10 repeats the process from S10 again after a certain period of time has elapsed.

In S16, the driving assistance ECU 10 determines whether or not the driver operates the accelerator and the brake through the first deceleration assistance execution unit 15. The first deceleration assistance execution unit 15 makes the above determination based on the accelerator operation signal of the accelerator pedal sensor 3 and the brake operation signal of the brake pedal sensor 4. When it is determined that the driver operates the accelerator and the brake (YES in S16), the driving assistance ECU 10 shifts the process to S20. When it is not determined that the driver operates the accelerator and the brake (NO in S16), the driving assistance ECU 10 shifts the process to S18.

In S18, the driving assistance ECU 10 executes the first deceleration assistance for the deceleration object through the first deceleration assistance execution unit 15. The first deceleration assistance execution unit 15 executes the first deceleration assistance according to the preset standard deceleration pattern G by transmitting the control signal to the actuator 6. Then, the driving assistance ECU 10 ends the current process.

In S20, the driving assistance ECU 10 performs shift to a second deceleration processing assistance process. FIG. 4 is a flowchart showing an example of a second deceleration assistance determination process.

As illustrated in FIG. 4, the driving assistance ECU 10 determines whether or not the driver releases the accelerator through the second deceleration assistance execution unit 16 in S30. The second deceleration assistance execution unit 16 determines that the driver releases the accelerator when it is determined that the amount of depression of the accelerator pedal of the driver has changed from a second accelerator operation determination threshold value or higher to less than the second accelerator operation determination threshold value, based on, for example, the accelerator operation signal of the accelerator pedal sensor 3. When it is determined that the driver releases the accelerator (YES in S30), the driving assistance ECU 10 shifts the process to S32. When it is not determined that the driver releases the accelerator (NO in S30), the driving assistance ECU 10 shifts the process to S34.

In S32, the driving assistance ECU 10 executes the deceleration assistance for accelerator release through the second deceleration assistance execution unit 16. The second deceleration assistance execution unit 16 executes the deceleration assistance for accelerator release as the second deceleration assistance, according to the preset deceleration pattern Gac for accelerator release. The deceleration pattern Gac for accelerator release is a deceleration assistance pattern having the deceleration upper limit value or the deceleration jerk upper limit value greater than the standard deceleration pattern G in the first deceleration assistance, or having the deceleration assistance start timing later than the standard deceleration pattern G. The second deceleration assistance execution unit 16 executes the deceleration assistance for accelerator release by transmitting the control signal to the actuator 6. Then, the driving assistance ECU 10 ends the current process.

In S34, the second deceleration assistance execution unit 16 determines whether or not the driver releases the brake. The second deceleration assistance execution unit 16 determines that the driver releases the brake when it is determined that the amount of depression of the brake pedal of the driver has changed from a second brake operation determination threshold value or higher to less than the second brake operation determination threshold value, based on, for example, the brake operation signal of the brake pedal sensor 4. When it is determined that the driver releases the brake (YES in S34), the driving assistance ECU 10 shifts the process to S36. When it is not determined that the driver releases the brake (NO in S34), the driving assistance ECU 10 shifts the process to S38.

In S36, the driving assistance ECU 10 executes the deceleration assistance for brake release through the second deceleration assistance execution unit 16. The second deceleration assistance execution unit 16 executes the deceleration assistance for brake release as the second deceleration assistance, according to the preset deceleration pattern Gbr for brake release. The deceleration pattern Gbr for brake release is a deceleration assistance having the deceleration upper limit value or the deceleration jerk upper limit value smaller than the standard deceleration pattern G in the first deceleration assistance, or having the deceleration assistance start timing later than the standard deceleration pattern G. The second deceleration assistance execution unit 16 executes the deceleration assistance for brake release by transmitting the control signal to the actuator 6. Then, the driving assistance ECU 10 ends the current process.

In S38, the driving assistance ECU 10 again determines whether or not the deceleration assistance precondition for the deceleration object is satisfied through the condition determination unit 14. When it is determined that the deceleration assistance precondition is satisfied (YES in S38), the driving assistance ECU 10 repeats the process from S30. When it is not determined that the deceleration assistance precondition is satisfied (No in S38), the driving assistance ECU 10 ends the current process. Then, the driving assistance ECU 10 repeats the process from S10 again after a certain period of time has elapsed.

With the driving assistance device 100 according to the present embodiment described above, the first deceleration assistance, which is executed when the deceleration assistance precondition is satisfied in the state in which the driver of the host vehicle does not operate the accelerator and the brake, and the second deceleration assistance, which is executed when the driver releases the accelerator or the brake in the state in which the deceleration assistance precondition is satisfied, are different in at least one of the deceleration upper limit value, the deceleration jerk upper limit value, or the deceleration assistance start timing, and therefore it is possible to execute the deceleration assistance with a less sense of discomfort to the driver in response to the driver's accelerator release or brake release than the case where the same deceleration assistance is executed without considering the driving operation of the driver.

Further, with the driving assistance device 100, the deceleration assistance for accelerator release is performed when the driver releases the accelerator in the state in which the deceleration assistance precondition is satisfied, and therefore it is possible to execute the deceleration assistance with less sense of discomfort to the driver in response to the driver's accelerator release. Similarly, with the driving assistance device 100, the deceleration assistance for brake release is performed when the driver releases the brake in the state in which the deceleration assistance precondition is satisfied, and therefore it is possible to execute the deceleration assistance with less sense of discomfort to the driver in response to the driver's brake release.

Further, with the driving assistance device 100, the deceleration assistance for accelerator release is performed when the driver releases the accelerator in the state in which the deceleration assistance precondition is satisfied and the deceleration assistance for brake release is performed when the driver releases the brake in the state in which the deceleration assistance precondition is satisfied, and thus it is possible to execute deceleration assistance with less sense of discomfort to the driver in response to the driver's accelerator release and brake release.

Although the embodiments of the present disclosure have been described above, the present disclosure is not limited to the above-described embodiments. The present disclosure can be carried out in various forms having various modifications and improvements based on the knowledge of those skilled in the art, including the above-described embodiments.

For example, the driving assistance ECU 10 does not necessarily include the type determination unit 12. The driving assistance ECU 10 may execute the first deceleration assistance or the second deceleration assistance based on the relative situation regardless of the type of deceleration object.

The second deceleration assistance may include just one of the deceleration assistance for accelerator release and the deceleration assistance for brake release. In this case, the second deceleration assistance execution unit 16 may be able to determine just one of the accelerator release and the brake release. The second deceleration assistance does not necessarily include the deceleration assistance for accelerator release or the deceleration assistance for brake release. The second deceleration assistance may be any deceleration assistance that uses a deceleration pattern different from that of the first deceleration assistance.

What is claimed is:

1. A driving assistance device that executes deceleration assistance of a host vehicle when a relative situation between a deceleration object in front of the host vehicle and the host vehicle satisfies a preset deceleration assistance precondition and a driver of the host vehicle does not operate an accelerator and a brake, the driving assistance device comprising:
    a first deceleration assistance execution unit configured to execute a first deceleration assistance when the deceleration assistance precondition is satisfied in a state in which the driver of the host vehicle does not operate the accelerator and the brake; and
    a second deceleration assistance execution unit configured to execute a second deceleration assistance when the driver releases the accelerator or the brake in a state in which the deceleration assistance precondition is satisfied,
    wherein the first deceleration assistance and the second deceleration assistance are different in at least one of a deceleration upper limit value, a deceleration jerk upper limit value, or a deceleration assistance start timing,
    wherein the second deceleration assistance execution unit is configured to execute a deceleration assistance for accelerator release as the second deceleration assistance when the driver releases the accelerator in a state in which the deceleration assistance precondition is satisfied and execute a deceleration assistance for brake release as the second deceleration assistance when the driver releases the brake in a state in which the deceleration assistance precondition is satisfied, and
    wherein the deceleration assistance for accelerator release is a deceleration assistance that has the deceleration upper limit value greater than the deceleration assistance for brake release, the deceleration jerk upper limit value greater than the deceleration assistance for brake release, and the deceleration assistance start timing earlier than the deceleration assistance for brake release,
    wherein the driving assistance device recognizes that the driver does not operate the brake when the amount of depression of the brake pedal of the driver is less than a first brake operation determination threshold value,
    wherein the second deceleration assistance execution unit determines that the driver releases the brake when it is determined that the amount of depression of the brake pedal of the driver has changed from a value greater than the second brake operation determination threshold value to a value less than a third brake operation determination threshold value,
    wherein the second brake operation determination threshold value is greater than the first brake operation determination threshold value, and
    wherein the third brake operation determination threshold value is smaller than the second brake operation determination threshold value.

2. The driving assistance device according to claim 1,
    the deceleration assistance for accelerator release is a deceleration assistance that has at least one of the deceleration upper limit value greater than the first deceleration assistance, the deceleration jerk upper limit value greater than the first deceleration assistance, or the deceleration assistance start timing later than the first deceleration assistance.

3. The driving assistance device according to claim 2,
    the deceleration assistance for brake release is a deceleration assistance that has at least one of the deceleration upper limit value smaller than the first deceleration assistance, the deceleration jerk upper limit value smaller than the first deceleration assistance, or the deceleration assistance start timing later than the first deceleration assistance.

4. The driving assistance device according to claim 1, the deceleration assistance for brake release is a deceleration assistance that has at least one of the deceleration upper limit value smaller than the first deceleration assistance, the deceleration jerk upper limit value smaller than the first deceleration assistance, or the deceleration assistance start timing later than the first deceleration assistance.

5. The driving assistance device according to claim 1, wherein the driving assistance device recognizes that the driver does not operate the accelerator when the amount of depression of the accelerator pedal of the driver is less than a first accelerator operation determination threshold value, wherein the second deceleration assistance execution unit determines that the driver releases the accelerator when it is determined that the amount of depression of the accelerator pedal of the driver has changed from the second accelerator operation determination threshold value or higher to less than a third accelerator operation determination threshold value wherein the second accelerator operation determination threshold value is a value greater than the first accelerator operation determination threshold value, and wherein the third accelerator operation determination threshold value is smaller than the second accelerator operation determination threshold value.

* * * * *